(12) United States Patent
Savvateev et al.

(10) Patent No.: US 8,928,745 B2
(45) Date of Patent: Jan. 6, 2015

(54) STEREOSCOPIC 3D DISPLAY DEVICE

(75) Inventors: Vadim N. Savvateev, Saint Paul, MN (US); William J. Bryan, Mahtomedi, MN (US); Anthony J. Piekarczyk, Fridley, MN (US); Scott E. Brigham, Maplewood, MN (US); Kathy L. Hagen, Stillwater, MN (US); Martin B. Wolk, Woodbury, MN (US); Craig R. Schardt, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1232 days.

(21) Appl. No.: 12/702,578

(22) Filed: Feb. 9, 2010

(65) Prior Publication Data

US 2010/0208041 A1 Aug. 19, 2010

Related U.S. Application Data

(60) Provisional application No. 61/152,311, filed on Feb. 13, 2009.

(51) Int. Cl.
*H04N 15/00* (2006.01)
*G02B 27/22* (2006.01)
*H04N 13/04* (2006.01)

(52) U.S. Cl.
CPC ........ *G02B 27/2207* (2013.01); *G02B 27/2264* (2013.01); *H04N 13/0422* (2013.01); *H04N 13/0431* (2013.01)
USPC .............................................. 348/60; 348/51

(58) Field of Classification Search
None
See application file for complete search history.

(56) References Cited

U.S. PATENT DOCUMENTS

| 5,745,164 | A | 4/1998 | Faris | |
|---|---|---|---|---|
| 7,402,831 | B2 | 7/2008 | Miller et al. | |
| 8,169,445 | B2 * | 5/2012 | Scott | 345/581 |
| 2005/0225630 | A1 * | 10/2005 | Childers et al. | 348/51 |
| 2007/0165317 | A1 * | 7/2007 | Thollot et al. | 359/892 |

(Continued)

FOREIGN PATENT DOCUMENTS

| DE | 10057102 A1 | 5/2002 |
|---|---|---|
| JP | 2000-148063 | 5/2000 |

(Continued)

OTHER PUBLICATIONS

Simon et al., "Interference-filter-based stereoscopic 3D LCD", Journal of Information Display, vol. 11, No. 1, Mar. 2010, pp. 24-27.

(Continued)

*Primary Examiner* — Christopher S Kelley
*Assistant Examiner* — Christopher Findley

(57) ABSTRACT

3D stereoscopic viewing enabled by the use of a fast switching speed LCD panel, dynamic backlight, and low cost glasses. The system utilizes an LCD panel with an LED backlight and wavelength selective glasses to isolate each channel by color. The system is based on alternating left and right image frames on an LCD panel. The left and right frames are illuminated by two slightly different red-green-blue light sources that are synchronized sequentially. The light sources are designed to emit light of different spectral composition. The viewer wears glasses where the left lens or filter passes only the spectrum of light used for the left channel of data, and the right lens or filter passes only the spectrum of light used for the right channel of data.

4 Claims, 4 Drawing Sheets

(56) References Cited

U.S. PATENT DOCUMENTS

| | | | |
|---|---|---|---|
| 2007/0188711 A1* | 8/2007 | Sharp et al. | 353/8 |
| 2007/0247709 A1 | 10/2007 | Karakawa | |
| 2008/0278807 A1 | 11/2008 | Richards et al. | |
| 2008/0284982 A1* | 11/2008 | Richards et al. | 352/38 |
| 2010/0066813 A1* | 3/2010 | Jorke | 348/46 |

FOREIGN PATENT DOCUMENTS

| | | |
|---|---|---|
| JP | 2003-264853 | 9/2003 |
| WO | WO 98/33331 | 7/1998 |
| WO | WO 01/56302 A1 | 8/2001 |
| WO | WO 02/071384 A1 | 9/2002 |
| WO | WO 2005/099279 | 10/2005 |
| WO | WO 2007/008109 A1 | 1/2007 |

OTHER PUBLICATIONS

Queren et al., "500 nm electrically driven InGaN based laser diodes", Appl. Phys. Lett. 94, 081119, American Institute of Physics, 2009, 3 pages.

Okamoto et al., "nonpolar *m*-plane InGaN multiple quantum well laser diodes with a lasing wavelength of 499.8 nm", Appl. Phys. Lett. 94, 071105, American Institute of Physics, 2009, 3 pages.

* cited by examiner

STEREOSCOPIC 3D DISPLAY DEVICE

REFERENCE TO RELATED APPLICATION

The present application claims priority to U.S. Provisional Patent Application Ser. No. 61/152,311 and filed Feb. 13, 2009, which is incorporated herein by reference as if fully set forth.

BACKGROUND

A number of technologies have been developed for stereovision, sometimes referred to as 3D or 3D-vision. They may be divided into 2 large classes: glasses-based and non-glasses based. The advantage of non-glasses technology is that the viewer does not need to wear glasses. The downside frequently is that the "sweet spot"—the range of head motion—is limited to +/−∼5 degrees. The use of glasses for watching motion video is largely based on simultaneous or sequential projections of two images on the screen.

The following are some of the more widely used glasses systems. Shutter glass systems are widely seen in European markets, for example the XpanD brand. Right and left images are projected onto the screen time sequentially. The liquid crystal display (LCD) shutters on the glasses are synchronized to the projected images and ensure that a viewer's right eye sees the "right" image only and the left eye only sees the "left" image. Polarization glasses include real D circularly polarized glasses of opposite "handedness" for right and left glasses. This system is most prominently promoted by the IMAX technology and supported by The Walt Disney Studios, DreamWorks Studios, and other studios. The Geowall Consortium uses a linear polarization system. Color filter glasses include the following: red/cyan anaglyph; and Dolby Laboratories 3D (color-wheel and multiple-bandpass filters).

SUMMARY

A 3D stereoscopic viewing system includes an LCD panel, a backlight for providing light to the LCD panel, and a controller for synchronizing the backlight with left and right frames of content. The backlight includes a first trichromatic primary set comprising light emitting diodes (LEDs) A, B, and C and a second trichromatic primary set comprising LEDs D, E, and F, where each of the LEDs emits light in a predominantly non-overlapping range of the visible spectrum. The system uses glasses to be worn by a viewer. The glasses have a first lens for filtering spectra of the first trichromatic primary set and a second lens for filtering spectra of the second trichromatic primary set. Therefore, the viewer's left and right eyes are provided with alternating left and right frames of the content to provide a 3D viewing experience.

BRIEF DESCRIPTION OF THE DRAWINGS

The invention may be more completely understood in the following detailed description of various embodiments of the invention in connection with the accompanying drawings, in which.

DETAILED DESCRIPTION

Figure 1:
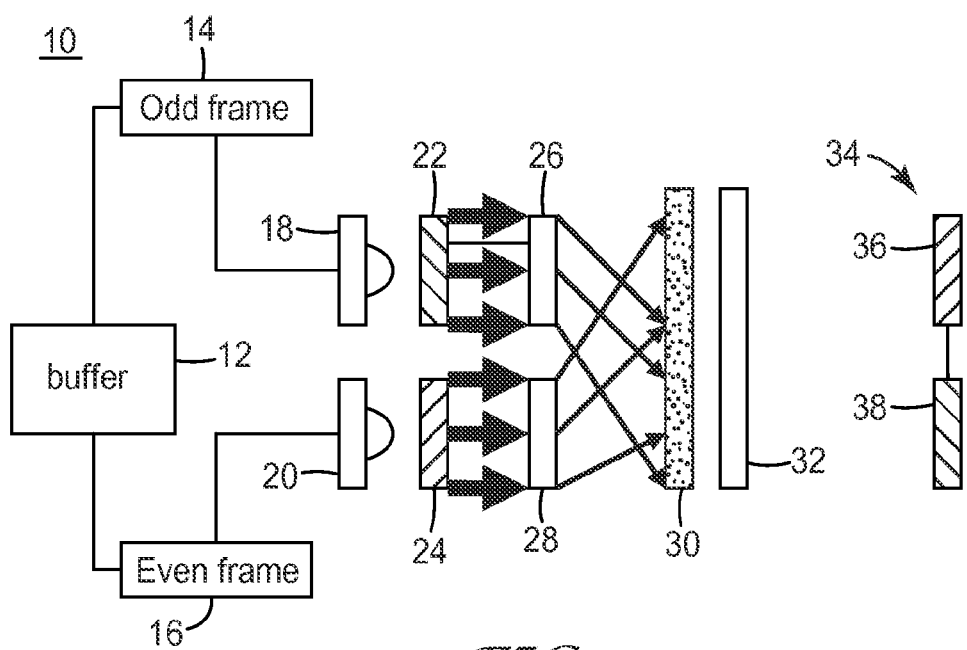
FIG. 1 is a diagram of a 3D system for Example I.

In the field of 3D displays, there exists the need to show true stereoscopic images and video content on standard LCD panels. The present invention involves the use of a fast switching speed LCD panel, dynamic backlight, and low cost glasses to enable 3D viewing. In particular, the system utilizes an LCD panel with an LED backlight and wavelength selective glasses to isolate each channel by color. The system is targeted for laptop PC, monitors and TV, but it could be used for smaller or other displays as well.

The system is based on alternating left and right image frames on an LCD panel. The left and right frames are illuminated by two slightly light sources that are synchronized sequentially. The light sources are engineered to emit light (typically white) of different spectral composition. In particular, the light sources can include a first trichromatic primary set including LEDs A, B, and C and a second trichromatic primary set including LEDs D, E, and F, where each of the LEDs emits light in a predominantly non-overlapping range of the visible spectrum. The sets of LEDs can include, for example, different red-green-blue (RGB) LEDs. As an alternative to LEDs, other light sources such as lasers or laser diodes can be used. Also, the LEDs or other light sources can optionally include a spectral filter to narrow the spectral emission band. Examples of short-wavelength LEDs for implementing the light sources are described in U.S. Pat. No. 7,402,831, which is incorporated herein by reference as if fully set forth. Examples of green direct-injection lasers for implementing the light sources are described in the following references: D. Queren et al., Appl. Phys. Lett. 94, 081119, American Institute of Physics (2009); and K. Okamoto et al., Appl. Phys. Lett. 94, 071105, American Institute of Physics (2009), both of which are incorporated herein by reference as if fully set forth.

The viewer wears glasses where the left lens or filter passes only the spectrum of light used for the left channel of data, and the right lens or filter passes only the spectrum of light used for the right channel of data. Therefore, the viewer's left and right eyes are provided with alternating left and right frames of the content to provide a 3D viewing experience.

The present invention combines some features of shutter-glass and color-filter based systems. The right and left images are displayed time sequentially on an LCD device or other display, for example a 4-6 primary organic light emitting diode or a 4-6 primary plasma display panel. This feature has some commonality with shutter glass system. The left and right frames are illuminated in direct-view LCD backlit system using two sets of LEDs designed to have different spectra with preferably minimum spectral overlap. The left and right images are decoded using bandpass-differential glasses, which allows improved color and depth information when multiple-bandpass filters are used. This feature has some commonality with anaglyph and Dolby stereovision systems.

EXAMPLES

The following examples have a single underlying principle, in particular the fast LCD panel is supplied with a sequence of images that are taken from two cameras, right and left located under slightly differing angles to simulate human stereoscopic images. Alternatively, sets of images imitating this arrangement may be synthesized using computer animation or similar techniques. The right- and left-eye images are sequentially displayed, meaning they are recorded as a sequence of frames in which every right-camera (or right eye) frame is preceded and followed by left-camera frames. Every left-eye image is also preceded and followed by right-eye frames. Two sources of light of different spectral composition are timed to turn on in sync with the images, the first source illuminating the right-eye image only and the second source illuminating the left-eye image only.

The viewer wears glasses with a different color filter for each eye. The left eye color filter is designed to transmit into the left human eye. The left eye color filter also blocks the emission by the light source timed to the right-eye image frame. The right eye color filter is similarly designed to transmit into the right human eye. The right eye color filter also blocks the emission by the light source timed to the left-eye image frame. Thus, the viewer receives only images taken by the right camera into the right eye and only images taken with the left camera into the left eye, allowing the viewer's brain to synthesize stereoscopic image perception.

The arrangement shown in Example I was fully assembled, tested, and confirmed to generate functionally stereoscopic images.

The arrangement in Example II illustrates a principle involving the design of a pair of multi-layer optical film (MOF) filters for viewer glasses with matching design of LED light engines for right and left eye channels.

Example III describes a simplified design of a color filter and light engines eye pairs involving single-notch filters, possibly made with MOF.

Example I

FIG. 1 illustrates a system 10 for Example I. In system 10, a buffer 12 provides odd and even frames 14 and 16 to light sources 18 and 20, which transmit the frames through color filters 22 and 24. The filtered odd and even frames are transmitted by optics 26 and 28 through a diffuser 30 to an LCD panel 32. A viewer wears glasses 34 having color filters 36 and 38.

Two sources of high brightness LEDs for light sources 18 and 20 are separately connected to drive electronics in buffer 12. The LCD panel 32 used had a high refresh rate of 120 Hz to display the alternating right- and left-eye frames continuously. The two sources of white LEDs 18 and 20 are turned on sequentially in sync with right-eye and left-eye frames displayed on the LCD panel 32. Thus, when left-eye frame is written on the LCD panel 32, the LED source 18 is turned on; source 18 is turned off immediately before the left-eye frame is erased and the right-eye frame is written onto the array of LCD pixels. After the right-eye frame is written onto the LCD panel, the LED source 20 is turned on; source 20 is turned off immediately before the right-eye frame is erased.

The sources used were CL-L102-C3N LEDs manufactured by Citizen Electronics Co., Ltd. Each source contained 3 LEDs connected in series. Each source of white LEDs was emitted through a color filter. The two color filters 22 and 24 are designed to transmit non-overlapping spectral bands.

Figure 2:
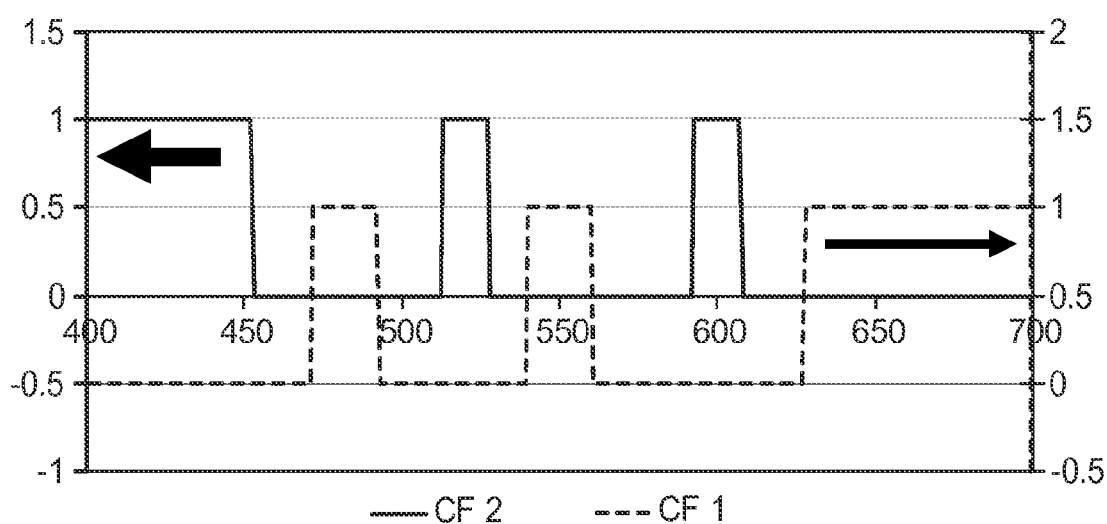
FIG. 2 is a diagram illustrating a design of two color filters for Example I.

In the experiment, the color filters 22 and 24 were designed to transmit, reflect, or absorb two bands of light. Color filter 22 transmits deep blue, emerald green, and yellow-orange spectral bands, and color filter 24 transmits in cyan, yellowish-green and deep red, as illustrated in FIG. 2 with CF 1 and CF 2 corresponding with color filters 22 and 24, respectively.

Optical elements 26 and 28 are used to project the two beams onto the diffusing plate placed behind the LCD panel 32. The particular optical arrangement is not essential for the illustrated principle. In the experiment, 25 centimeter (cm) long apertures were used to collimate the beams, and 5 cm×7.5 cm flat mirrors were used to deflect and direct the beams onto the diffuser 30. The viewer observes the image through glasses 34. The color filters 36 and 38 are identical to color filters 22 and 24 and are used as the right and left "lenses" for glasses 34. Thus, the Odd and Even frames 14 and 16 displayed on the LCD panel 32 are timed to backlighting with light flashes of non-overlapping spectral composition. The images of the Odd and Even frames are then filtered and directed into right and left eye by the glasses 34. Only information taken by right camera is projected into the viewer's right eye, and only left-camera image is projected into viewer's left-eye. In this experiment, a number of viewers observed credible 3D images.

Example II

Figure 5:
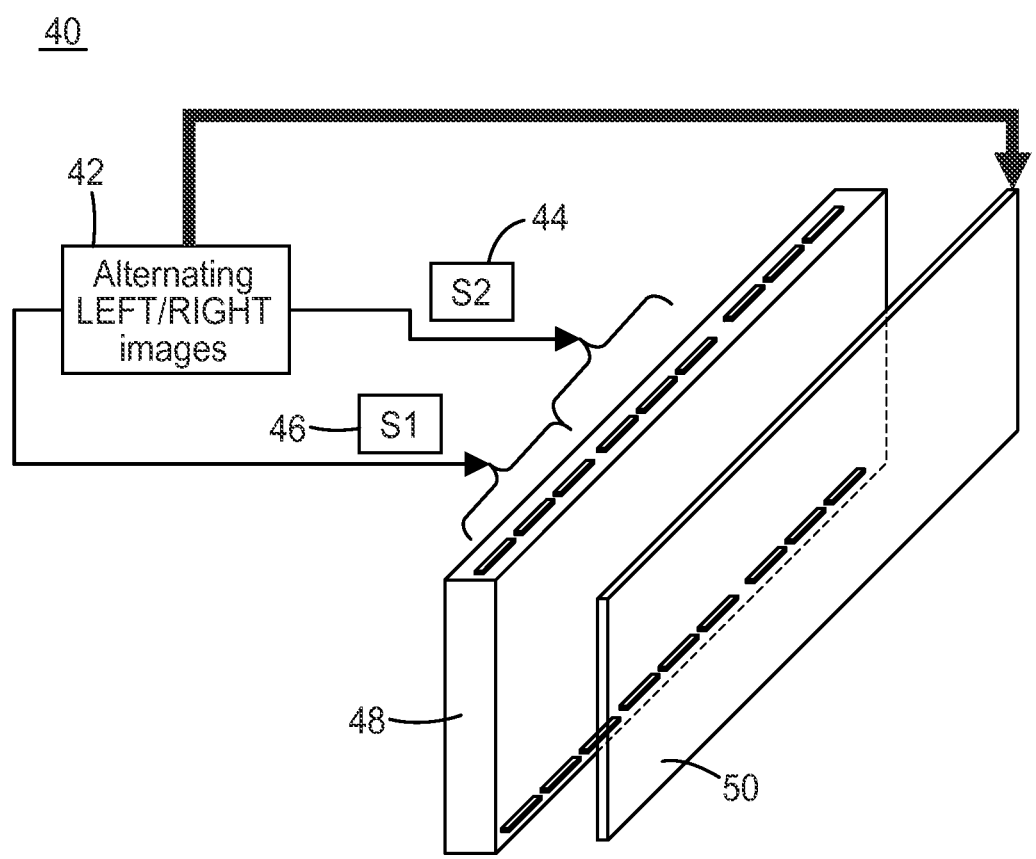
FIG. 5 is a diagram of LED light sources arranged in a hollow edge lit LCD backlight for Example II.

FIG. 5 illustrates a system 40 for Example II. In system 40, the system electronics 42 transmit alternating left and right images to an LCD panel 50, and the system electronics 42 also control activation of light sources 44 and 46, which transmit light through a light guide 48 to provide backlighting for LCD panel 50.

Two different types of LED sources are used in this example. The viewer uses glasses with two different color filters, CF 1 and CF 2.

Figure 3:
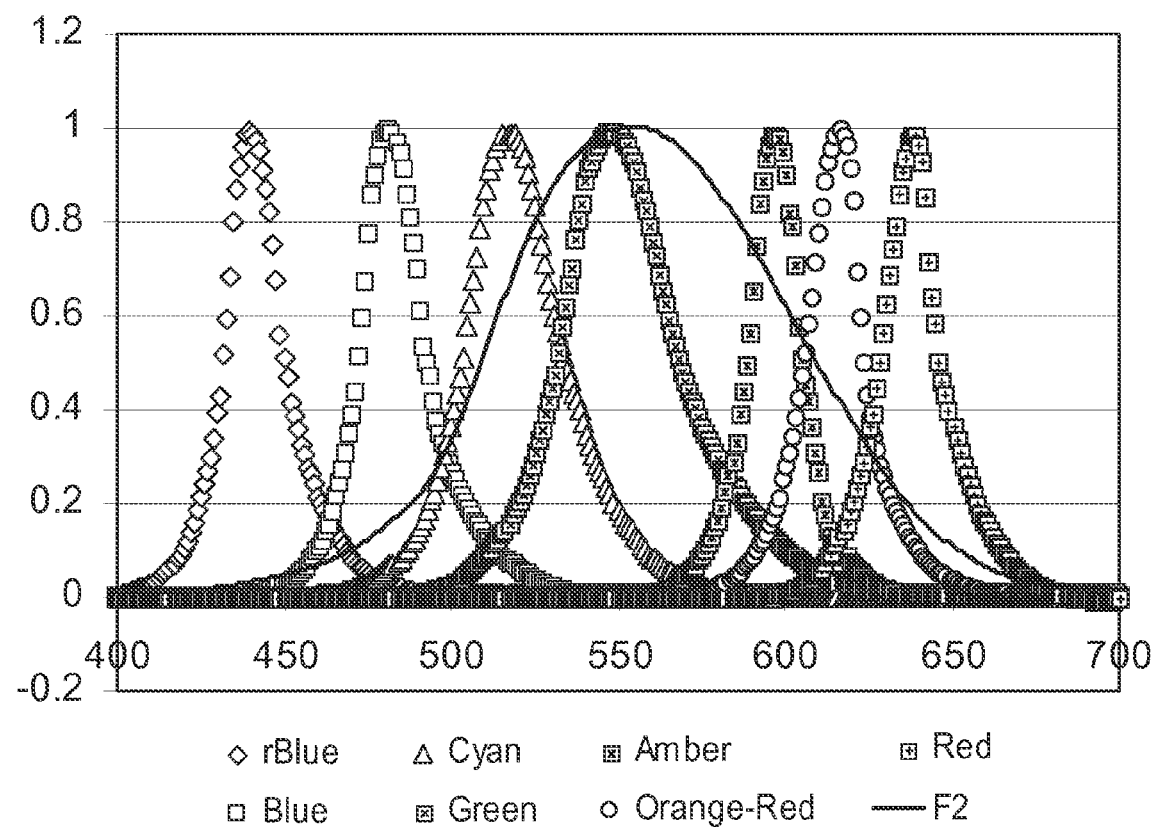
FIG. 3 is a diagram of spectra of LEDs for Example II.

FIG. 3 shows the spectra of Luxeon Rebel LEDs used in designing Example II. The diagram in FIG. 3 presents the actual color bins of Luxeon Rebel LEDs (see publication DS56 from Philips Lumileds Lighting Co. for the bin definition) used for modeling: rBlue (bin 3); Blue (bin 5); Cyan (bin 6); Green (bin 6); Amber (bin 7) and Red (bin 5). The wider trace F2 presents the photopic visibility curve (V-plot).

Each source is composed of LEDs of 3 different colors. In this example, it is assumed that source S1 (46) is composed of Blue, Green, and Red LEDs, and source S2 (44) is composed of Royal Blue, Cyan and Yellow LEDs (see FIG. 3). The color names and spectra used were from the Luxeon Rebel data sheets for illustration in this example. Different color sets and LEDs from different suppliers may be used, including mixing of parts from different manufacturers and color nomenclature.

Figure 4A:
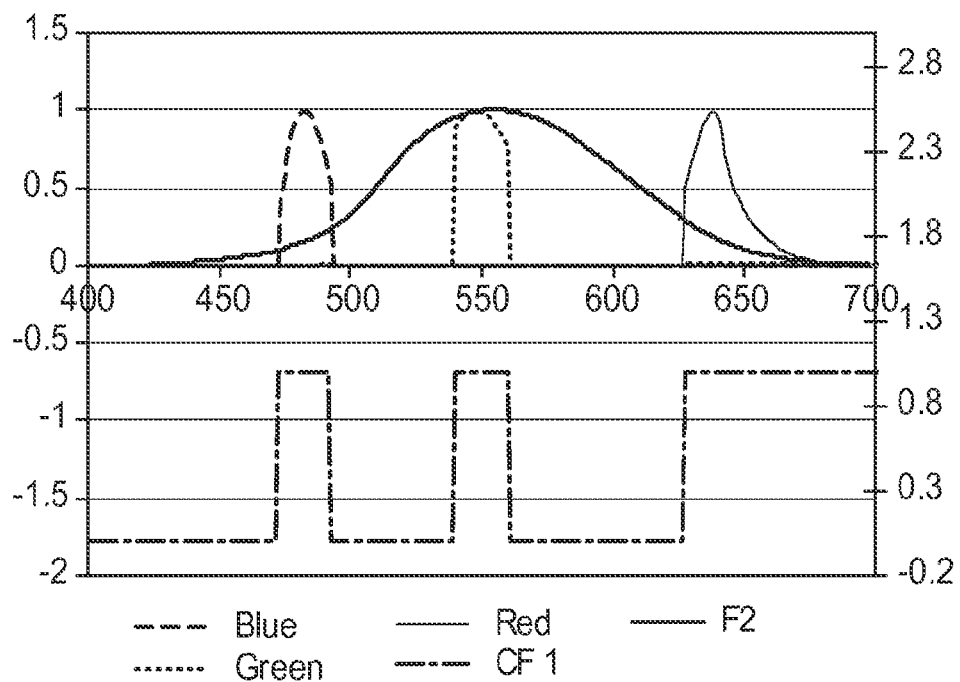
FIGS. 4A and 4B are diagrams of transmittance and transmitted spectra for Example II.
Figure 4B:
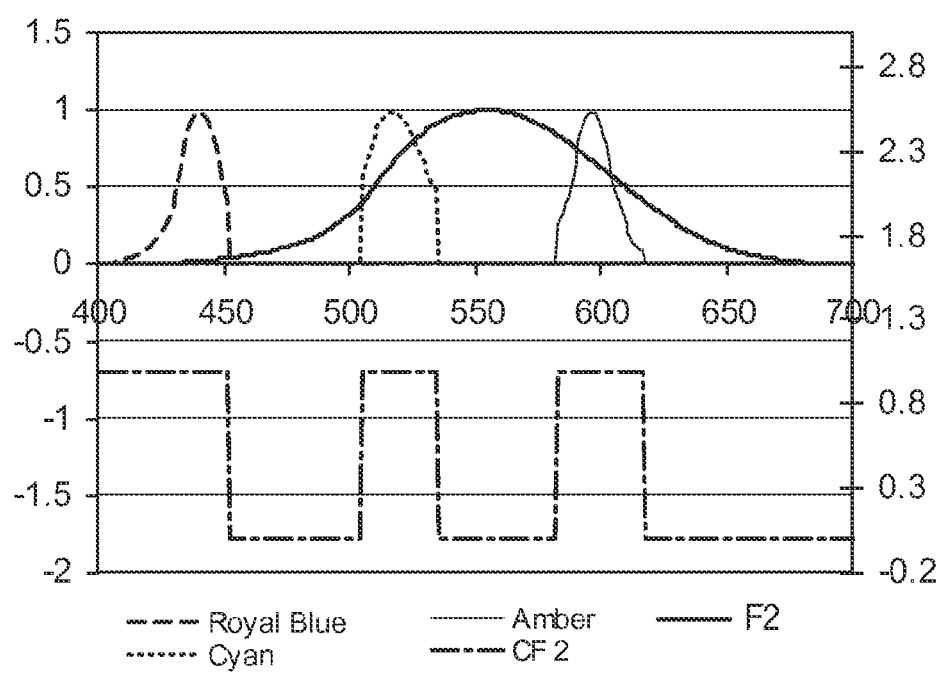

As illustrated in FIG. 4A, one color filter (CF 1) is designed to transmit light from all LEDs in the first source (S1) and not transmit light bands from all LEDs in the second source (S2). As illustrated in FIG. 4B, another color filter (CF 2) is designed to transmit light from all LEDs in the second bank (S2) and not transmit light bands from all LEDs in the first source of LEDs (S1). As illustrated in FIG. 5, the system electronics 42 transmits to the LCD panel 50 a sequence of interlaced images, where each frame taken by the left camera is preceded and followed by images taken by the right camera, and vice versa.

When an image taken with the left camera is displayed on the LCD panel, the first source of LEDs is turned on, and the second source is off because the left glass in the glasses (CF 1) transmits light from the first source S1 (46). The left image is transmitted into the viewer's left eye. Because the right glass in glasses (CF 2) does not transmit light from the first source S1 (46), the left image is not transmitted into the viewer's right eye. Thus, images taken by the left camera are projected into the viewer's left eye and not into the viewer's right eye.

When an image taken with the right camera is displayed on the LCD panel, the second source of LEDs S2 (44) is turned on, and the first source S1 (46) is off because the right glass in the glasses (CF 2) transmits light from the second source S2

(44). The right image is transmitted into the viewer's right eye. Because the left glass in glasses (CF 1) does not transmit light from the second source S2 (44), the right image is not transmitted into the viewer's left eye. Thus, images taken by the right camera are projected into the viewer's right eye and not into the viewer's left eye.

The system design space for Example II encompasses several variations, including but not limited to, the following. The color filters CF 1 and CF 2 may use various underlying optical principles for filtering light, reflecting it back, deflecting from the axis into viewer's eye for an effective field of view, absorbing light, or combination thereof. In particular, CF 1 and CF 2 may be designed as a multilayer optical film with specified transmission parameters. Sets of LEDs and color filters may be designed to include more emission bands for each channel and respective number of transmission bands in color filters. An LCD backlight, solid or hollow, edge-lit or direct-lit, can be used. The system may be designed as a projection system, front projection or back projection, with imaging element as a liquid crystal on silicon or other micro-array. The color and composition of the color filter and LED source pairs associated with right and left images are permutable.

Example III

Most of visibly perceptible light from RGB or rBCyY groups of LEDs balanced at the white point is carried by the "middle" member of the LED source: Green or Cyan LED with emission spectrum concentrated in the middle portion of the photopic curve (see the wider trace in FIG. 3). Therefore, a 3D effect may be achieved not by complete separation of all three color components as in Example II, but merely by separating for right and left images a lumen-dominant component.

Such system would have the following 2 sources of LEDs: a first source composed of Red, Green 1, and Blue LEDs; and a second source composed of Red, Green 2, and Blue LEDs.

A viewer would use glasses with different color filters on the right and left eye (permutable). One color filter would be designed to transmit light emitted by the Blue, Red, and Green 1 LEDs and to not transmit the part of spectrum in which the Green 2 LED emits. A second color filter would be designed to transmit light emitted by the Blue, Red, and Green 2 LEDs and to not transmit the part of spectrum in which the Green 1 LED emits. Such color filters may be created, for example, as multi-layer notch filter optical stacks with a single notch band.

The invention claimed is:

1. A 3D stereoscopic viewing system, comprising:
an LCD panel;
a backlight for providing light to the LCD panel, the backlight comprising:
a first set of red, green or cyan, and blue LEDs having, respectively, first ranges of red, green or cyan, and blue spectra; and
a second set of red, green or cyan, and blue LEDs having, respectively, second ranges of red, green or cyan, and blue spectra,
wherein the first range of red spectra is the same as the second range of red spectra, the first range of blue spectra is the same as the second range of blue spectra, and the first range of green or cyan spectra is different from the second range of green or cyan spectra;
a controller for synchronizing the backlight with left and right frames of content transmitted to the LCD panel; and
glasses to be worn by a viewer, the glasses having a first lens for filtering the first range of green or cyan spectra and having a second lens for filtering the second range of green or cyan spectra such that the viewer's left and right eyes are provided with alternating left and right frames of the content for a 3D images viewing experience, and the difference between the first range of green or cyan spectra and the second range of green or cyan spectra is sufficient to provide the 3D images to the viewer via the glasses.

2. The system of 1, wherein the first and second lenses each comprise a multi-layer notch filter.

3. A 3D stereoscopic viewing system, comprising:
a display surface for displaying projected content;
a light source for projecting light to the display surface, the light source comprising:
a first set of red, green or cyan, and blue LEDs having, respectively, first ranges of red, green or cyan, and blue spectra; and
a second set of red, green or cyan, and blue LEDs having, respectively, second ranges of red, green or cyan, and blue spectra,
wherein the first range of red spectra is the same as the second range of red spectra, the first range of blue spectra is the same as the second range of blue spectra, and the first range of green or cyan spectra is different from the second range of green or cyan spectra;
a controller for synchronizing the light source with left and right frames of content projected to the display surface; and
glasses to be worn by a viewer, the glasses having a first lens for filtering the first range of green or cyan spectra and having a second lens for filtering the second range of green or cyan spectra such that the viewer's left and right eyes are provided with alternating left and right frames of the content for a 3D images viewing experience, and the difference between the first range of green or cyan spectra and the second range of green or cyan spectra is sufficient to provide the 3D images to the viewer via the glasses.

4. The system of 3, wherein the first and second lenses each comprise a multi-layer notch filter.

* * * * *

UNITED STATES PATENT AND TRADEMARK OFFICE
CERTIFICATE OF CORRECTION

| | | |
|---|---|---|
| PATENT NO. | : 8,928,745 B2 | Page 1 of 1 |
| APPLICATION NO. | : 12/702578 | |
| DATED | : January 6, 2015 | |
| INVENTOR(S) | : Savvateev et al. | |

It is certified that error appears in the above-identified patent and that said Letters Patent is hereby corrected as shown below:

In the Claims

Col. 6, line 23, in Claim 2, delete "of 1," and insert -- of claim 1, --.

Col. 6, line 53, in Claim 4, delete "of 3," and insert -- of claim 3, --.

Signed and Sealed this
Twenty-second Day of December, 2015

Michelle K. Lee
*Director of the United States Patent and Trademark Office*